United States Patent

Sonty et al.

[11] Patent Number: 5,825,989
[45] Date of Patent: Oct. 20, 1998

[54] SYSTEM FOR DIAGNOSING A SOURCE OF MALFUNCTION RESULTING FROM THE EXECUTION OF A PRINT JOB IN A NETWORK PRINTING SYSTEM

[75] Inventors: Atashi C. Sonty, Pittsford; John R. Hill, Jr., Rochester; Thomas B. Zell, Victor, all of N.Y.

[73] Assignee: Xerox Corporation, Stamford, Conn.

[21] Appl. No.: 646,008

[22] Filed: May 7, 1996

Related U.S. Application Data

[63] Continuation of Ser. No. 75,694, Jun. 11, 1993, abandoned, which is a continuation-in-part of Ser. No. 898,761, Jun. 12, 1992, Pat. No. 5,493,634.

[51] Int. Cl.[6] ................................................ G06F 15/00
[52] U.S. Cl. .................................... 395/113; 391/181
[58] Field of Search .................................. 395/101, 106, 395/109, 113, 116, 181, 182.04, 182.06, 183.01, 570, 183.02; 399/16, 18, 19, 21, 22; 340/852.2; 370/241, 242; 358/504, 405, 413, 437; 382/184

[56] References Cited

U.S. PATENT DOCUMENTS

| | | | |
|---|---|---|---|
| 3,575,589 | 4/1971 | Neema | 395/18 |
| 4,179,732 | 12/1979 | Khan et al. | 395/115 |
| 4,649,515 | 3/1987 | Thompson et al. | 395/61 |
| 4,654,852 | 3/1987 | Bentley et al. | 395/183.22 |
| 4,745,602 | 5/1988 | Morrell | 395/181 |
| 4,873,687 | 10/1989 | Breu | 395/182.02 |
| 5,010,551 | 4/1991 | Goldsmith et al. | 395/183.22 |
| 5,065,314 | 11/1991 | Maskovyak | 345/831 |
| 5,075,875 | 12/1991 | Love et al. | 395/117 |
| 5,146,344 | 9/1992 | Bennett et al. | 358/296 |
| 5,159,685 | 10/1992 | Kung | 395/183.02 |
| 5,202,726 | 4/1993 | McCulley et al. | 399/11 |
| 5,208,814 | 5/1993 | Ulrich et al. | 395/184.01 |
| 5,220,674 | 6/1993 | Morgan et al. | 395/114 |
| 5,249,299 | 9/1993 | Iwata | 395/800 |
| 5,257,373 | 10/1993 | Kurihara et al. | 395/704 |
| 5,262,872 | 11/1993 | Yoshimura et al. | 358/296 |
| 5,287,434 | 2/1994 | Bain et al. | 395/115 |
| 5,293,466 | 3/1994 | Bringmann | 395/114 |

*Primary Examiner*—Joseph Mancuso
*Assistant Examiner*—Gabriel I. Garcia
*Attorney, Agent, or Firm*—Gary B. Cohen

[57] ABSTRACT

An apparatus is provided for diagnosing a selected print job transmitted to a printing system, the selected print job causing the printing system to malfunction when the selected print job is processed by the printing system. The diagnosing apparatus includes an apparatus for capturing the selected print job as it is transmitted to the printing system, and a storage section, communicating with the capturing arrangement, for holding the selected print job. A medium receives the selected print job from the storage section to transfer the selected print job to a diagnostic device for ascertaining the cause of the printing system malfunction with the selected print job.

6 Claims, 8 Drawing Sheets

SYSTEM FOR DIAGNOSING A SOURCE OF MALFUNCTION RESULTING FROM THE EXECUTION OF A PRINT JOB IN A NETWORK PRINTING SYSTEM

The present application is a continuation of application Ser. No. 08/075,694, filed Jun. 11, 1993, now abandoned, which is a continuation-in-part of U.S. patent application Ser. No. 07/898,761, filed on Jun. 12, 1992 now U.S. Pat. No. 5,493,634 is assigned to the same assignee as the present application.

BACKGROUND OF THE INVENTION

The present invention relates an apparatus and method for diagnosing a selected print job which causes a printing system to malfunction when the selected print job is processed by the printing system.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc.

On the other hand, larger high speed laser printers normally have a great deal of finishing and copy sheet capability which would allow the PC user to have, for example, custom printing and finishing of his work product, an option which for many PC users would be highly desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing of the job. In particular, LANs provide a means by which users running dedicated processors are able to share resources such as printers, file servers and scanners. Integration of shared resources has been a problem addressed by LAN managers. LAN managers have made different network protocols transparent to devices running different network protocols. LANs also have a variety of print drivers emitting different page description languages (PDLs), which are directed to specific print devices.

A PDL, such as Interpress provided by Xerox® Corp. permits arithmetic computation, conditional execution, and procedure definition, in addition to special operations that construct a page image. Typically, a PDL supports imaging characters in a variety of fonts, faces, sizes and orientations, as well as line art, graphics and pictorial images. Because it is a language, the PDL describes a document in terms of software, the software being used to generate primitives that can be imaged onto a substrate with a marking engine. Further information regarding Interpress can be found in the following reference, the pertinent portions of which are incorporated herein by reference:

Harrington, S. J. and Buckley, R. R.
  Interpress: The Source Book
    Simon & Schuster, Inc.
      New York, N.Y.
        1988

While the use of a PDL to store and transmit an input document is desirable for several reasons, such use can complicate printing since much effort must be expended by the printer in converting the PDL of the input document into hardware imaging primitives that actually produce the print. In particular, an input format of an input document written in a PDL contains primitives that are at a "higher level" than the imaging primitives, so that the input document must be "taken apart" into its individual imaging components with a decomposing technique or the like. Preferably, a decomposer, with one or more processors and suitable software, is employed to implement the technique.

In operation, the decomposer executes the PDL to generate the imaging primitives. The types of operations required to perform this task include binding of the printer fonts to the requested fonts, any imaging processing on pictorial information, and/or converting line art/graphics to lower level imaging primitives. This process has historically taken much longer than the actual imaging, resulting in loss of throughput. It would therefore be desirable to provide a decomposer that minimizes the amount of time required to perform decomposing functions and, correspondingly, maximizes output.

Occasionally, print jobs received at the decomposer result in decomposer malfunction. This malfunction can occur for various reasons. More particularly, each job includes a master and a set of printing instructions. Accordingly, in one example, malfunction can occur as a result of a conflict between the master and the printing instructions. In another example, malfunction can occur as a result of the content of either the master or the printing instructions. It would be desirable to provide an arrangement which facilitates the delivery of a given print job to a diagnostic apparatus when it is determined that such given print job is the cause of decomposer malfunction.

SUMMARY OF THE INVENTION

In accordance with one aspect of the disclosed embodiment, an apparatus is provided for diagnosing a selected print job transmitted to a printing system, the selected print job causing the printing system to malfunction when the selected print job is processed by the printing system. The diagnosing apparatus includes: an arrangement for capturing the selected print job as it is transmitted to the printing system; a storage section, communicating with the capturing arrangement, for holding the selected print job. The diagnosing apparatus further includes a diagnostic means and a medium for receiving the selected print job from the storage section to transfer the selected print job to the diagnostic means for ascertaining the cause of the printing system malfunction with the selected print job.

In accordance with another aspect of the disclosed embodiment, the diagnosing apparatus includes the arrangement for capturing the selected print job as it is transmitted to the printing system and means, responsive to an enabling condition, for controlling the capturing arrangement with the controlling means permitting print jobs to be captured when the enabling condition is met.

These and other aspects of the invention will become apparent from the following description, the description being used to illustrate a preferred embodiment of the invention when read in conjunction with the accompanying drawings.

DESCRIPTION OF A PREFERRED EMBODIMENT

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
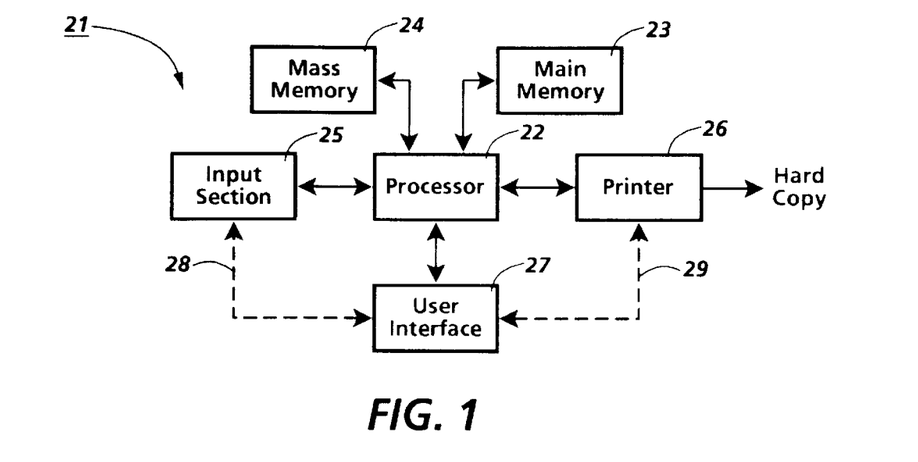
FIG. 1 is a schematic, block diagrammatic view of an electronic printing machine in which the present invention can be carried out.

Turning now to the drawings, and at this point especially to FIG. 1, there is an electronic document processing system 21 to illustrate a typical environment for this invention. In keeping with standard practices, the document processing system 21 comprises a digital processor 22 having a main memory 23 and a mass memory 24, an input section 25 for providing a job written in a printer page description language (PDL), and a printer 26 for printing hardcopy renderings of selected image components obtained from the PDL. Furthermore, there is a user interface 27 for enabling a user to interact with the processor 22, the input section 25, and the printer 26.

As will be understood, the user interface 27 collectively represents the input devices through which the user enters image editing and manipulation instructions for the processor 22. Additionally, the interface 27 represents the output devices through which the user receives feedback with respect to the actions that are taken in response to the instructions that are entered by the user or otherwise, such as under program control. For example, the user interface 27 generally includes a keyboard or the like for entering user instructions, a monitor for giving the user a view of the process that is being performed by the processor 22, and a cursor controller for enabling the user to move a cursor for making selections from and/or for entering data into a process that is being displayed by the monitor (none of these conventional components is shown).

The illustrated document processing system 21 is centralized, so it has been simplified by assuming that all control instructions and all image editing and manipulation instructions are executed by the processor 22 under program control. In practice, however, the execution of these instructions may be handled by several different processors, some or all of which may have their own main memory and even their own mass memory. Likewise, either or both of the input section 25 and the printer 26 may have its own user interface, as indicated by the dashed lines 28 and 29, respectively. Indeed, it will be evident that the document processing system 21 could be reconfigured to have a distributed architecture to operate with a remote input section and/or a remote printer (not shown). Data could be transferred from and to such remote input section and printer terminals via dedicated communication links or switched communication networks (also not shown).

Figure 2:
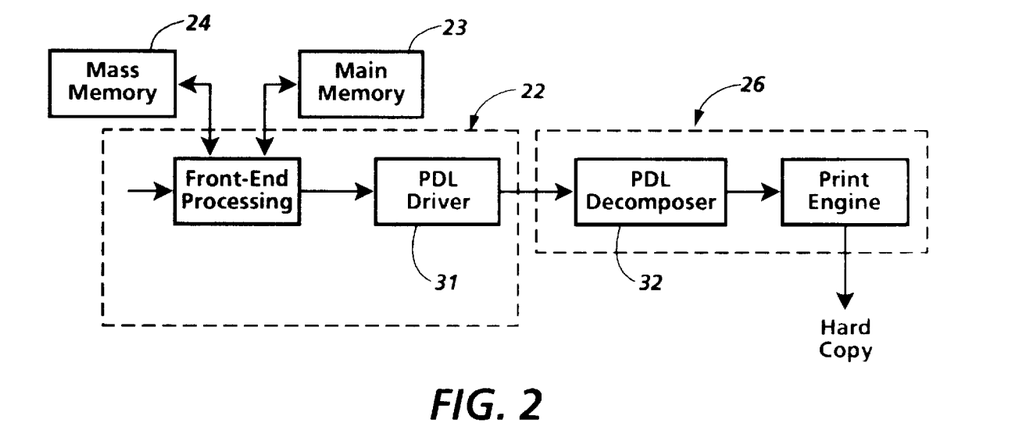
FIG. 2 is a schematic, block diagrammatic view of a processor/printer interface for the printing machine shown in FIG. 2.

As shown in FIG. 2, the processor 22 preferably includes a PDL driver 31 for transferring to the printer 26 PDL descriptions of the electronic document files that are selected for printing. Thus, the printer 26 is illustrated as having a PDL decomposer 32 for decomposing such PDL descriptions to produce corresponding bitmapped image file. It will be appreciated, particularly in view of the discussion below, that the decomposer 32 is capable of receiving PDL files from mass memory, such as disk, or from off the network "on the fly."

Figure 3:
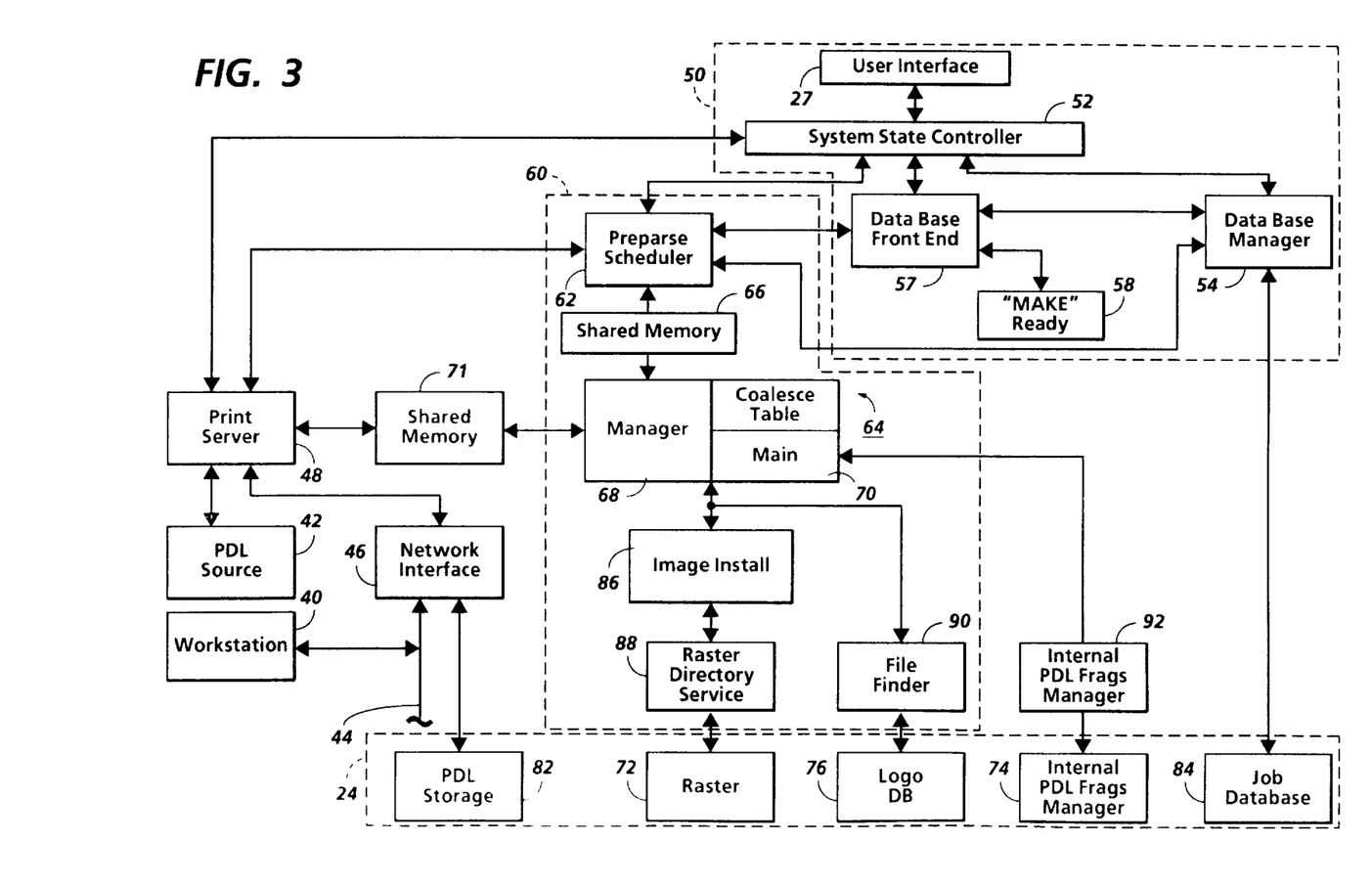
FIG. 3 represents a schematic, block diagrammatic view of an arrangement for capturing and parsing a print job written in a printer page description language.

Referring to FIG. 3, an arrangement including the mass memory 24, the input section 25 and portions of the decomposer 32 is shown. Referring specifically to FIG. 3, the input section 25 preferably comprises a plurality of up to two PDL emitters, such as a workstation 40, or any other suitable PDL source 42. In one Example the workstation 40 is Xerox® 6085 (the term "Xerox 6085" is trademark used by Xerox® Corp.) workstation coupled with a network 44, such as a network sold by Xerox® Corp. under the trademark of EtherNet™. The network is interfaced with the decomposer by way of a suitable network interface 46, which could include one of many known interfaces such as TCPIP™, AppleTalk™ or Token Ring™. Both of the workstation 40 and the PDL source 42 are interfaced with the decomposer by way of a print server 48, which print server 48 can be a suitable protocol corresponding with the specifications of the PDL Source 42 and/or the network interface 46. The print server 48 communicates with a system manager 50.

In the preferred embodiment, the system manager 50 comprises a system state controller (SSC) 52 of the type disclosed in U.S. Pat. No. 5,170,340 to Prokop et al., the pertinent portions of which are incorporated herein, the user interface (UI) 27, which, in one example, is of the type disclosed in U.S. Pat. No. 5,083,210, the pertinent portions of which are incorporated herein, a database manager 54 and a database front end processor 57. Additionally, the database manager 54 preferably comprises a database job queue (not shown) and a database coalescer table (not shown). The features of the present invention can be obtained through use of any suitable, commercially available database. Alternatively, one of ordinary skill in the art could, without undue experimentation, construct the database of the present invention by reference to one of several known texts, such as the following text:

Martin, J.
  Computer Data-Base Organization
  Prentice Hall, Inc.
    Englewood Cliffs, N.J.
    1975

The database front end processor 57, which serves to define the structure of the PDL job, and the sequence in which image related identifiers stored in the database are operated on, can be constructed by those skilled in the art in view of the type of database manager selected for use. As will be appreciated from the discussion below, the database manager 54 is the conduit through which virtually all image related identifiers and all job identifiers ("handles") flow. Moreover, editing of postparsed information is achieved by use of a "make ready" process 58 which is coupled with the front end 57. The "make ready" process, which serves to interpret operator commands for performing bitmap processing, is used in the DocuTech™ electronic printer which is sold by Xerox® Corp.

Referring still to FIG. 3, the print server 48, the SSC 52 and the data base front end processor 57 each communicate with a parsing section 60 by way of a preparse scheduler 62. In the preferred embodiment, the steps of the parsing section 60 are performed on a MESA™ processor of the type manufactured by Xerox® Corp. The preparse scheduler 62 communicates with a preparser 64 by way of a block of shared memory 66. In the preferred embodiment of the present invention, the preparser consists of a manager section 68 and a main section 70. In one example, the manager section comprises a processor of the type referred to immediately above, and the main section comprises a similar processor and a math coprocessor which, for the most part, is similar to commercially available math coprocessors. Additionally, the manager 68 communicates with the print server 48 by way of a block of memory 71, and the main section 70 is configured to store a coalesce table, the significance of which will be discussed in further detail below.

The preparser 64, which serves to break up PDL into image related components, is capable of storing those components in mass memory 24, which, in the preferred embodiment is a disk storage device, such as the one used on the DocuTech™ electronic printer manufactured by Xerox® Corp. Preferably, the disk storage device is adapted to receive rasters in raster storage section 72 and internal PDL fragments ("internal PDL frags") in internal PDL frags. section 74. It should be recognized that internal PDL fragments are higher level primitives to be imaged on a substrate. In one example, an internal PDL fragment serves to transform coordinate systems inputted to the decomposer for printing. Employment of other storage sections in the mass memory 24 to receive other image related components is contemplated by the present invention.

In practice, the mass memory 24 is configured to not only receive and store the image related components developed by the preparser 64, but to store, on a long term basis, a relatively large variety of logos (in logo DB storage section 76) and fonts (in a font section (not shown)). Employment of other storage sections in the mass memory 24 to store other image related components, on a long term basis, is contemplated by the present invention. Additionally, the disk storage device preferably includes section 82 for storing PDL files to be processed and a section 84 for storing all information communicated to the database manager 54. In one example, the job database 84 is adapted to contain a structure for and image related components of a job written in a PDL. It will be appreciated by those skilled in the art that a suitable memory arrangement could be used in place of the job database without affecting the underlying concept of the present invention.

In practice, the preparser 64 is interfaced to the raster section 72 by way of an image install process 86 and a raster directory service (DS) 88, to the logo DB section by way of a file finder process 90 and to the Internal PDL Frags section by Internal PDL Frags Manager 92. In the illustrated embodiment of FIG. 3, the raster DS 88 is adapted to assign an image identifier to each raster transmitted thereto, and pass each of those identifiers to the preparser 64. Similarly, the internal PDL frags manager 92 is adapted to assign an image identifier to each internal PDL fragment transmitted thereto, and pass each of those identifiers to the preparser 64. On the other hand, the file finder 90 assigns an identifier to calls for logos received at the preparser 64 from the print server 48, and permits the logos to be fetched by the preparser 64 when they are available in the logo DB section 76. When the called for logo is not available in the logo DB section, the file finder 90 is capable of issuing an appropriate fault message for display at the UI 27 or for printing with a hardcopy print.

It should be recognized that selected portions of the decomposer 32, such as a coalescer and a post-parser, are not shown in FIG. 3. Further details regarding the structure and operation of these components are discussed in U.S. Pat. No. 5,493,634 to Bank et al. the pertinent portions of which are incorporated herein.

Figure 4:
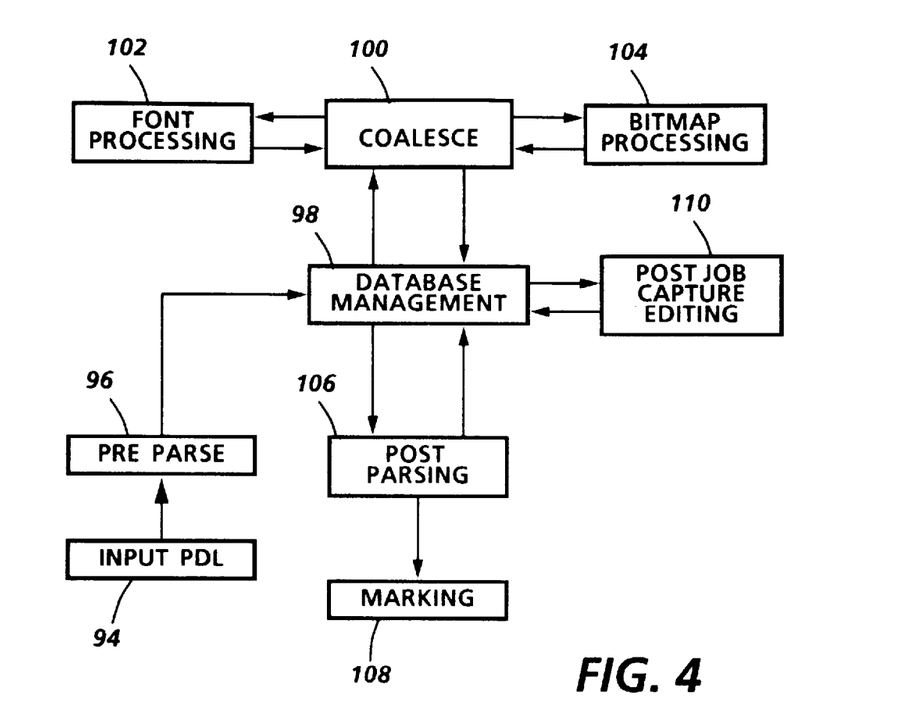
FIG. 4 is a flow diagram providing an overview for the function of a decomposer of the type in which the arrangement of FIG. 3 is employed.

Referring to FIG. 4, an overview of the operation of the PDL Decomposer 32 (FIG. 2) is shown. To initiate decomposition, a job is communicated from the input section 25 to the decomposer 32 (step 94). After appropriate coordination has occurred, information is passed to the preparse section 64 (FIG. 3) (step 96), the information is parsed into image related components and, per step 98, identifiers corresponding to the components are stored in the job database 84 by the database manager 54. Some time after a first page of the job is parsed, the identifiers are passed from the database to a coalesce section (step 100) for font processing (step 102) and bitmap processing (step 104). Coalesced information is then postparsed (step 106) to form a bandlist, and the bandlist is marked at step 108. In the preferred embodiment, coalesced information can be edited (step 110).

A more detailed view of the present invention can be obtained by reference to Sections A–C of an attached Appendix, including significant portions of code employed to implement the capture technique of the present invention. The code is written in MESA™ language, the details of which are discussed in the commercially available Mesa™ Language Manual (Copyright of Xerox® Corp. 1985), the pertinent portions of which are incorporated herein by reference. Referring briefly to the Sections, definitions for the code begin on page 1, while a discussions regarding job capture and preparse scheduling begin on pages 297 and 361, respectively. For further details regarding code relating to preparsing, coalescing, etc., reference can be made to Sections D–H of the Appendix in U.S. Pat. No. 5,493,634 Bonk et al. Sections D–H being incorporated herein by reference. Some general comments regarding the code, and other specific comments regarding interfaces used in the disclosed code are provided below:

Open or portable systems are achieved if the systems are not bounded by any single utility such as an operating system. Definition files or interfaces provide a level of data abstraction. For example, given a set of interfaces defining required utilities for a decomposer to function in a system, the utilities can be implemented independent of and transparent to the decomposer. An interface between a client and a service is a functional definition between modules. Most importantly an interface is not an executable set of instructions. Alternatively, an interface is defined as an agreed upon protocol between client and service.

More specifically, all decomposer source code presented is accompanied with external interfaces that provide functional specifications for required utilities not included in the Appendix, such as database management, network management, system management, image management and memory management. External interfaces to non-decomposer functional specifications are listed in the Appendix A. Sections B and C of the Appendix list decomposer source code for capture and preparse scheduling functions as well as internal interfaces for use with each respective module. Internal interfaces enable communication between elements inside individual modules as opposed to external modules.

Figure 5:
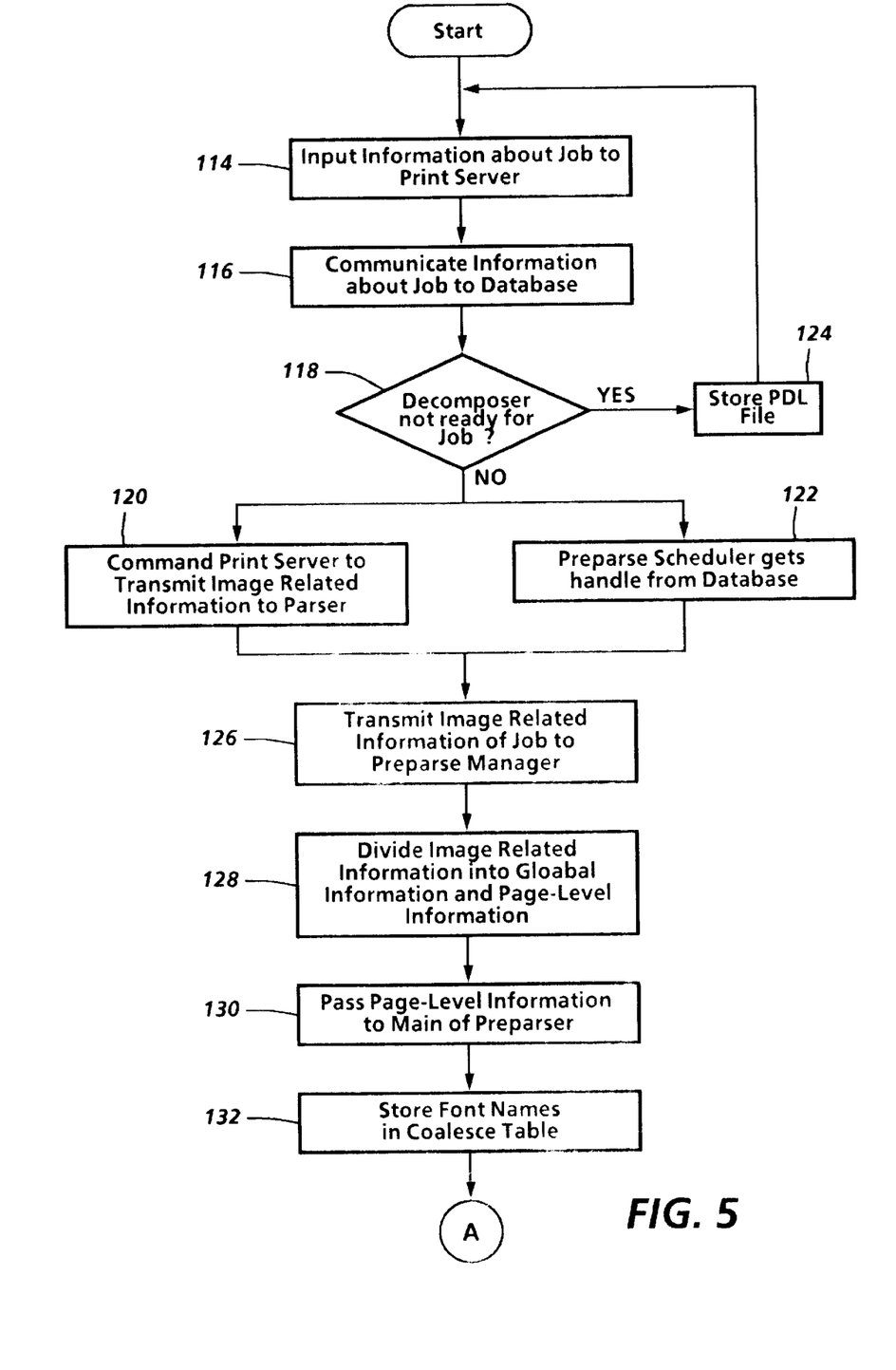
FIGS. 5 and 6 represent a flow diagram depicting the operation of a parsing system of the type used in the arrangement of FIG. 3.
Figure 6:
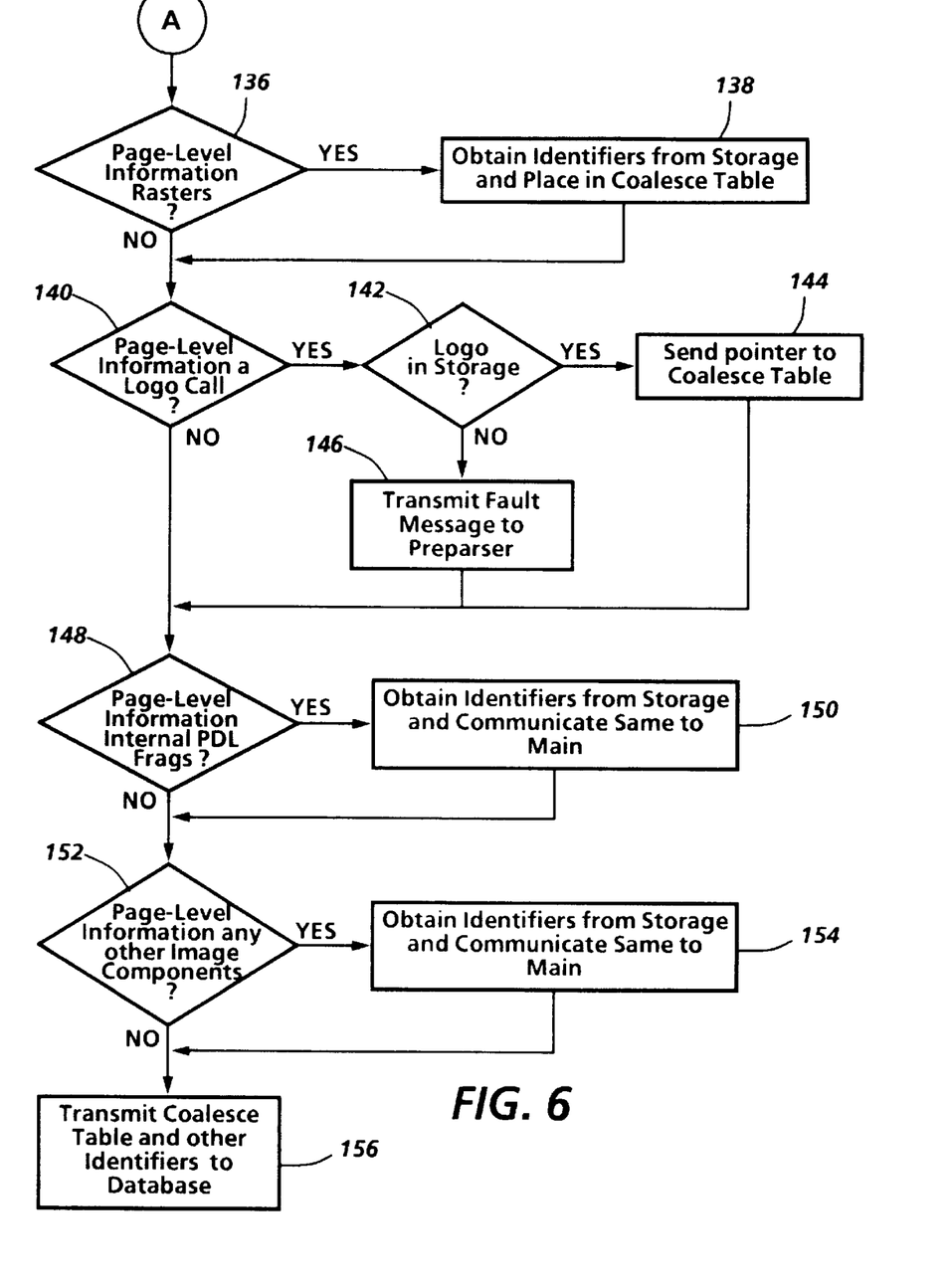

Referring to FIGS. 5–6, the inputting and parsing of the PDL file(s) will be discussed in further detail. Referring specifically to FIG. 5, at step 114, a job file written in a particular PDL, such as Interpress used by Xerox® Corp., is provided from either the workstation 40 (FIG. 3) or the PDL source 42. For those situations in which the job is developed on the workstation 40, a job ticket, of the type shown in U.S. Pat. No. 5,170,340 to Prokop et al., the pertinent portions of which are incorporated herein, may be employed. Preferably, the job ticket provides various instructions for, among other things, printing a selected print job. It should be recognized that much of the information transmitted to the decomposer 32, in the form of the ticket, is included in the form of global information, versus page level information. Additionally, while generating his/her program, the programmer may include calls to rasters, logos and other like bitmaps that he/she knows is on the machine. Accordingly, as will become clear from the discussion below, that call can be used Asian identifier to pull up one or more image related components, such as a logo, for eventual printing at the printer 26.

Upon inputting the PDL job to the print server 48, basic information regarding, for example, the structure of the job and the order in which the job should be processed, is transmitted to the database manager 54 (step 116) by way of the preparse scheduler 62 and the database front end processor 57. The database manager 54 indicates to the SSC 52 that it has a job, and in due course, provided that the decomposer is ready (see step 118), the SSC 52 commands the print server 48 to begin transmitting blocks of the PDL file to the manager section 68 across shared memory block 71 (step 120) and causes the preparse scheduler 62 to obtain a job identifier ("handle") from the database manager 54 (step 122). The handle represents the information that the preparse scheduler 62 will need to pass the image related identifiers resulting from the parsing process on to the database manager 54. Alternatively, as illustrated by steps 118 and 124, if a job is ready to be inputted concurrent with a job being processed, the job that is ready to be inputted can be stored for subsequent processing.

As the PDL is transmitted to the manager section 68 (step 126), it is, per step 128, broken down into global information, such as a header and a preamble, and page level information. Additionally, the manager 68 finds the beginning of each page within the job file ("master") for setting up the image related components ("data structures") to be received by the main section 70. Essentially, the manager functions as a syntactical analyzer, insuring that the syntax of the encoded PDL master is correct. The manager preferably performs some pre-work for the main 70 and possesses limited interpretative capabilities.

At step 130, page-level information is passed from the manager 68 to the main 70 at which information, or, more specifically, data structures are created. The main 70 looks into a linked list of set up pages and sequentially decomposes them. The manager and the main can work on separate pages or the main can work ahead of the manager within a page. Once the manager has created a data structure for a page, the main executes data structures within the page for storage in the mass memory 24. Per step 132, the main 70 inserts any font names that it gleans from pages in a coalesce table stored in the main.

Referring to FIG. 6, once the page-level data structures are available, identifiers therefore are obtained. If rasters or bitmaps are found among the data structures (step 136), they are communicated to the raster storage section 72 by way of the image install 86 and the raster DS 88. Per step 138, the rasters are assigned identifiers by the raster directory service, and the identifiers are passed to the main 70 for placement in the coalesce table. If logo calls, i.e., calls for a merge item, are found among the data structures (step 140), the file finder 90 checks to see if the logos are in the logo DB section 76 (step 142). For those logos in the logo DB, corresponding pointers for the available logos are communicated to the main (step 144) for placement in the coalesce table. For those logos not in the logo DB, a fault message is, per step 146, returned to the main for eventual display or printing into hardcopy. Per steps 148 and 150, internal PDL fragments are created and communicated to the internal PDL frags storage section 74 by way of the internal PDL frags manager 92. Per step 150, the internal PDL fragments are assigned identifiers or "tokens" by the internal PDL frags manager 92, and the identifiers are passed to the main 70. As shown by steps 152 and 154 any other data structures flowing from the main 70 would be handled in a manner similar to that shown for rasters or internal PDL fragments. After all of the identifiers are provided to the main 70, a signal is sent to the preparse scheduler 62, and the identifiers, per 156, are communicated to the database manager 54.

Figure 7:
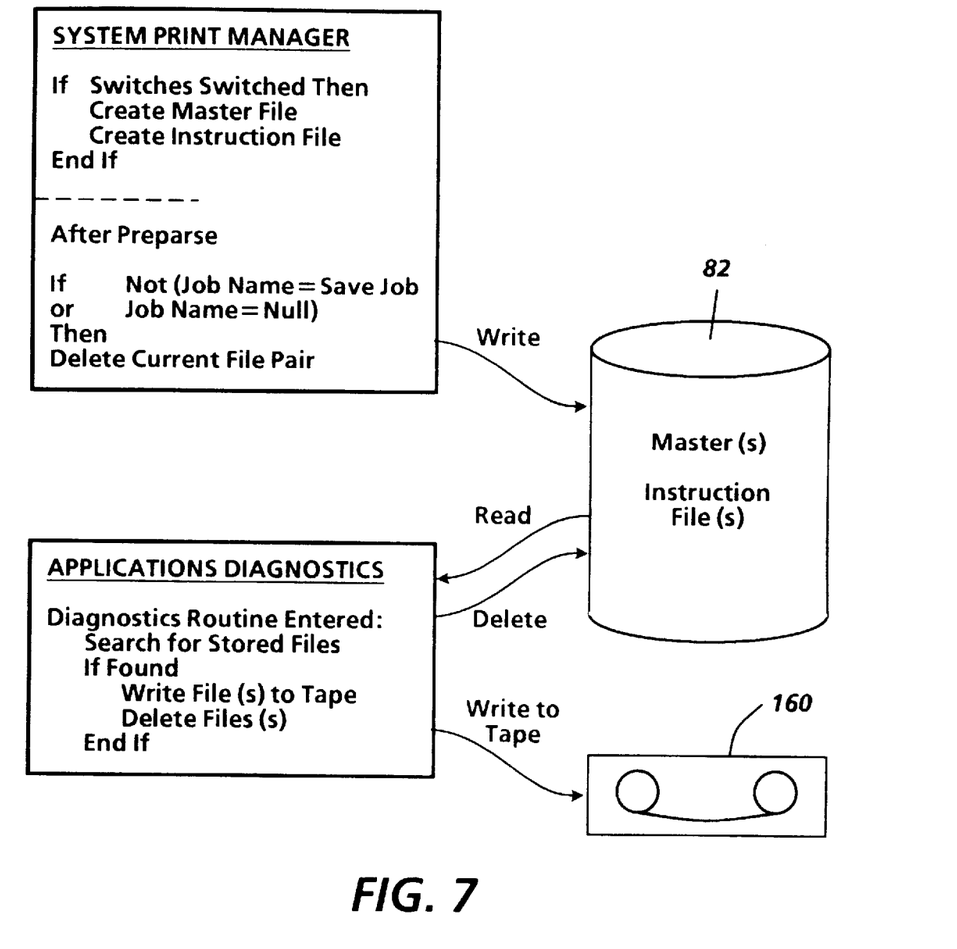
FIG. 7 is a schematic, block diagram illustrating a preferred arrangement to process a print job for diagnosis.

Referring to FIG. 7, an overview of an arrangement for capturing, storing and transferring a print job, is shown. Referring to the section entitled "SYSTEM PRINT MANAGER", a customer service engineer ("CSE") sets a plurality of switches, as explained in further detail below, so that a file pair, comprising a master file and a print instructions file, is created for each job that is transmitted to the decomposer subsequent to the switches being switched. Each file pair having either no job name or a special job name, such as "SaveJob", is written to the PDL storage section 82. Referring to the section entitled "APPLICATIONS DIAGNOSTICS", each file pair which was stored while the switches were switched is then written to a storage media 160.

Figure 8:
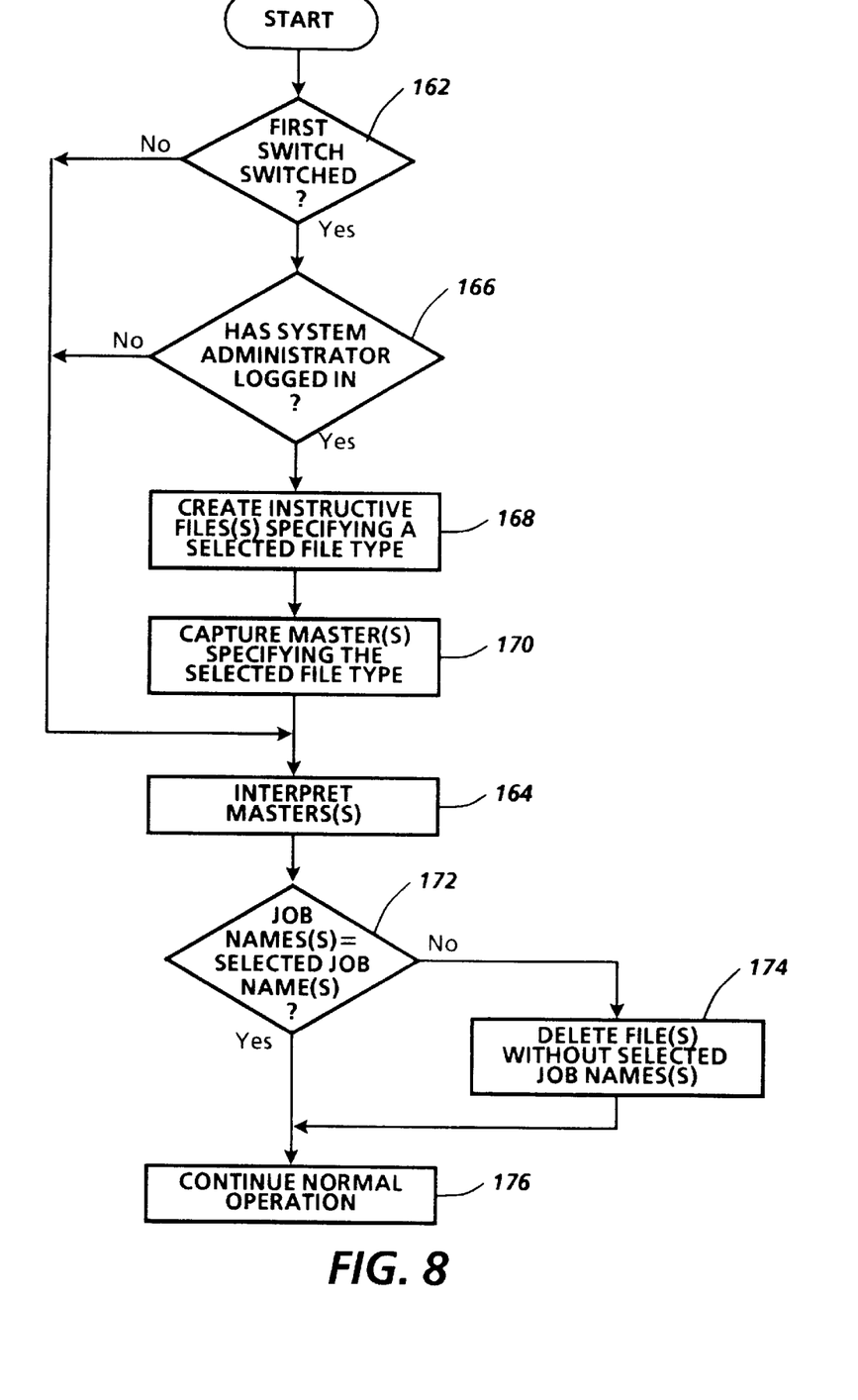
FIG. 8 is a flow diagram depicting the capture of print files inputted to the decomposer.
Figure 9:
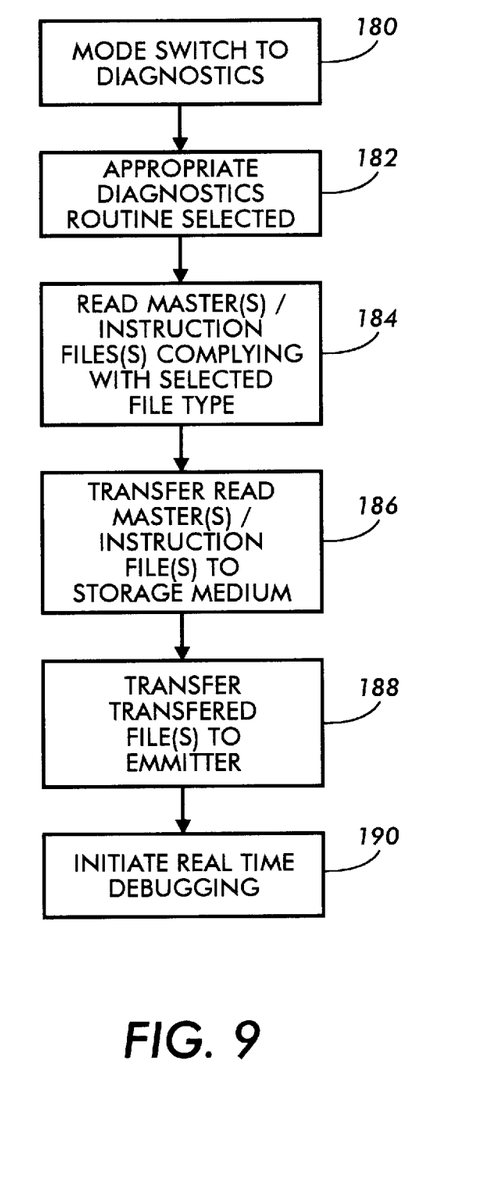
FIG. 9 is a flow diagram depicting the transfer of captured print files to a storage medium.

Referring to FIGS. 8 and 9, the capture, storage and transfer processes are explained in further detail. In step 162, a first switch, which can assume the form of either a hard-wired switch or a software based switch, is tested. If the switch is unswitched, then the process proceeds to step 164 at which that portion of the job known as the master is interpreted or, more specifically, parsed. If, on the other hand, the first switch is switched, then the process checks a second condition at step 166. It will be appreciated by those skilled in the art that while a machine log-in step is shown as the second condition, other conditions, such as a second switch being switched, could be used for the second condition at step 166 without changing the concept upon which the present embodiment is based.

It should be appreciated that use of two enabling conditions, or switches, promotes security in that agreement between two machine users is required to enable operation. That is, in the preferred embodiment, one condition is enabled by one entity, such as a technical representative, while another condition is enabled by another entity, such as a system administrator. Accordingly, files are stored and captured, in accordance with one preferred embodiment, only when two users concur by executing respective enabling conditions.

Assuming that both conditions are met, i.e. an interval for job capture is initiated, one or more file pairs are created at steps 168 and 170. More particularly, each file is designated as a selected file type, the significance of which designation will be discussed in further detail below. For each interpreted or parsed master, the corresponding job name is tested (step 172) and if the corresponding job name differs from a preselected job name, then the corresponding job is deleted (step 174). In the preferred embodiment, the client user whose job is causing decomposer malfunction, may be instructed to transmit a job to the decomposer with a special name, such as "SaveJob" or "CaptureJob". It is further assumed that jobs without names are to be captured, stored and transferred in accordance with the preferred embodiment. After the interval for capturing jobs has elapsed, the switches are unswitched and, per step 176, normal operation is resumed. The illustrated embodiment of FIG. 8 is directed toward a model of decomposition in which only designated jobs are stored. It will be appreciated by those skilled in the art that in a model of decomposition where spooling is desired, the process of FIG. 8 would have to be altered appropriately. An example of an appropriate spooling model can be found in copending, now allowed (issue fee paid) U.S. patent application Ser. No. 08/000,074, filed by Cattapano et al. on Jan. 4, 1993, the pertinent portions of which are incorporated herein.

The above discussion of FIG. 8 merely characterizes much of what is already disclosed in the attached Appendix. It should be noted that the attached Appendix is copied from Sections A–C of the Appendix for U.S. patent application Ser. No. 07/898,761. Software support for much of the image data capture technique illustrated by FIG. 8 can be found in the Appendix at pages 320–335 and pages 405–411.

Referring to FIG. 9, subsequent to resuming normal operation, each file pair having the preselected job name and being specified with the selected file type is transferred to a storage medium. In particular, the printer 26 (FIG. 2) is mode switched to "Diagnostics" (step 180) and the appropriate "Diagnostics Routine" is selected (step 182). In step 184, file pairs with the selected file type are read and then, per step 186, copies of the read file pairs are transferred to a storage medium. It should be recognized that only file pairs of the selected file type are read from the PDL storage section 82 since jobs other than those intended for diagnosis may be stored in the PDL storage section. While the storage medium 160 (FIG. 7) may be shown as tape, it will be appreciated by those skilled in the art that the storage medium could assume any form which would be suitable for storing image data. For example, the storage medium could assume the form of floppy disk, hard disk, etc. Finally, in step 186, once copies of the file pairs are copied to the storage medium, corresponding originals in the PDL storage section 82 are deleted. To diagnose the transferred files, they are, per step 188, transferred to an emitter so that real time debugging can, per step 190, be initiated.

Numerous features of the disclosed embodiment will be appreciated by those skilled in the art. One feature is that a selected print job, which is known to cause the malfunction of a printing system can be captured readily and stored for subsequent transfer to a suitable storage medium. Another feature is that the captured job is suitably labeled so that its transfer to the suitable medium is facilitated. Yet another feature is that the selected print job is secure in that it cannot be stored or transferred unless certain predefined safeguards have been taken by.

What is claimed is:

1. In a network printing system for decomposing a plurality of jobs, each of which plurality of jobs normally includes a job name, a diagnostic system for diagnosing one or more special jobs, each of which special job is characterized by a special or null job name, each job with the special or null name causing the printing system to malfunction, comprising:

a capturing subsystem, communicating with said network, for receiving each of the plurality of jobs;

a storage device for storing each of the plurality of jobs in the storage device in anticipation of decomposition thereof;

an interpretation subsystem, communicating with said storage device, for parsing at least a header portion of a copy of each of the plurality of jobs, said parsing being performed to an extent necessary for obtaining the job name of each job copy;

a system manager, communicating with said interpretation subsystem, for examining the job name of each job, wherein when the examined job name for one of the plurality of jobs does not correspond with the special or null job name, a copy of the one of the plurality of jobs is parsed in full, with said interpretation subsystem, and the one of the plurality of jobs is deleted from said storage device without performing a diagnostic routine thereon; and a diagnostic subsystem, communicating with said system manager, said diagnostic subsystem performing the diagnostic routine on the one of the plurality of jobs, when the examined job name of the one of the plurality of jobs corresponds with the special or null job name, so as to determine what it is about the one of the plurality of jobs that causes the printing system to malfunction.

2. The diagnostic system of claim 1, further comprising a portable storage device to which a copy of the one of the plurality of jobs is transferred when the examined job name of the one of the plurality of jobs corresponds with the special or null job name.

3. The diagnostic system of claim 2, wherein, in response to transferring the one of the plurality of jobs to said portable storage device, a corresponding job original stored in said storage device is deleted.

4. The diagnostic system of claim 1, further comprising a switch for disposing the diagnostic system in one of a first state and a second state, said storage device being responsive to the disposition of said switch such that no job, a copy of which has been introduced to said interpretation subsystem, is maintained in said storage section unless said switch is disposed in the first state.

5. The diagnostic system of claim 3, further comprising a second switch for disposing the diagnostic system in one of a first state and a second state, said storage device being responsive to the disposition of both said switch and second switch such that no job, a copy of which has been introduced to said interpretation subsystem, is maintained in said storage section unless both said switch is disposed in the first state and said second switch is disposed in the first state.

6. The diagnostic system of claim 1, wherein each job whose job name corresponds with the special job name is divided into multiple portions to facilitate the diagnosis thereof.

* * * * *